US010372501B2

(12) United States Patent
Shaffer et al.

(10) Patent No.: US 10,372,501 B2
(45) Date of Patent: Aug. 6, 2019

(54) PROVISIONING OF COMPUTING RESOURCES FOR A WORKLOAD

(71) Applicant: INTERNATIONAL BUSINESS MACHINES CORPORATION, Armonk, NY (US)

(72) Inventors: Michael J. Shaffer, Bransbury (GB); Kevin B. Smith, Eastleigh (GB); David R. Waddling, Winchester (GB)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 132 days.

(21) Appl. No.: 15/353,259

(22) Filed: Nov. 16, 2016

(65) Prior Publication Data

US 2018/0136980 A1  May 17, 2018

(51) Int. Cl.
*G06F 9/50* (2006.01)

(52) U.S. Cl.
CPC ................... *G06F 9/5061* (2013.01)

(58) Field of Classification Search
CPC ............................ G06F 9/5038; G06F 9/5072
See application file for complete search history.

(56) References Cited

U.S. PATENT DOCUMENTS

| 8,037,475 | B1 | 10/2011 | Jackson |
| 8,776,066 | B2* | 7/2014 | Krishnamurthy ..... G06F 9/5038 718/102 |
| 8,825,862 | B2 | 9/2014 | Anderson et al. |
| 8,896,867 | B2* | 11/2014 | Gross ................... G06F 3/1212 358/1.12 |
| 8,954,586 | B2 | 2/2015 | Anderson et al. |

(Continued)

OTHER PUBLICATIONS

Mell, Peter, et al., "The NIST Definition of Cloud Computing", NIST Special Publication 800-145, Sep. 2011, Gaithersburg, MD, 7 pgs.

(Continued)

*Primary Examiner* — James J Lee
*Assistant Examiner* — Jorge A Chu Joy-Davila
(74) *Attorney, Agent, or Firm* — Brian Restauro, Esq.; Matthew M. Hulihan, Esq.; Heslin Rothenberg Farley & Mesiti PC (57) ABSTRACT

Provisioning of computing resources for a workload in a networked computing environment. A method receives a set of provisioning requests in a computer data structure of a networked computing environment, wherein the provisioning requests relate to a workload request. The method further identifies a set of provisioning operations for computing resources in the networked computing environment to perform the provisioning requests. The method determines, for each provisioning operation of the provisioning operations, a respective provisioning time, the respective provisioning time being an amount of time for a particular computing resource to become prepared and equipped to perform a job. The determining the respective provisioning time for each provisioning operation provides a plurality of determined provisioning times. The method also determines an order for the provisioning requests based on the plurality of determined provisioning times, such that the provisioning operations complete at substantially a same time.

18 Claims, 7 Drawing Sheets

(56) References Cited

U.S. PATENT DOCUMENTS

2007/0240159 A1* 10/2007 Sugiyama .......... H04N 1/00885
 718/102
2013/0007244 A1 1/2013 Gnech et al.
2014/0278807 A1 9/2014 Bohacek

OTHER PUBLICATIONS

Gandhi, Anshul, et al., "Modeling the Impact of Workload on Cloud Resource Scaling", 2014 IEEE 26th International Symposium on Computer Architecture and High Performance Computing, Oct. 22-24, 2014, pp. 310-317.

* cited by examiner

PROVISIONING OF COMPUTING RESOURCES FOR A WORKLOAD

BACKGROUND

To make efficient use of physical hardware resources, a networked computing environment, such as cloud computing, is often used to allocate them in an efficient manner. While a cloud infrastructure is marketed as being a pool of unlimited virtual resources, the virtual resources are backed by a finite pool of physical resources. While these physical resources can be used more efficiently by sharing them between virtual infrastructures, there is a hard cap on what virtual resources are available. A plurality of resources may be required to use clustering functionality or for other reasons. The resources may each be required to be fully provisioned and configured in order to communicate with each other, however the provisioning times of the resources may vary.

SUMMARY

Aspects described herein relate to provisioning of computing resources, and more specifically, to provisioning of computing resources for a workload. Shortcomings of the prior art are overcome and additional advantages are provided through the provision of a computer-implemented method. The method receives a set of provisioning requests in a computer data structure of a networked computing environment, wherein the provisioning requests relate to a workload request. The method further identifies a set of provisioning operations for computing resources in the networked computing environment to perform the provisioning requests. The method determines, for each provisioning operation of the provisioning operations, a respective provisioning time, the respective provisioning time being an amount of time for a particular computing resource to become prepared and equipped to perform a job. The determining the respective provisioning time for each provisioning operation provides a plurality of determined provisioning times. The method also determines an order for the provisioning requests based on the plurality of determined provisioning times, such that the provisioning operations complete at substantially a same time.

Further, a computer program product including a computer readable storage medium readable by a processor and storing instructions for execution by the processor is provided for performing a method. The method receives a set of provisioning requests in a computer data structure of a networked computing environment, wherein the provisioning requests relate to a workload request. The method further identifies a set of provisioning operations for computing resources in the networked computing environment to perform the provisioning requests. The method determines, for each provisioning operation of the provisioning operations, a respective provisioning time, the respective provisioning time being an amount of time for a particular computing resource to become prepared and equipped to perform a job. The determining the respective provisioning time for each provisioning operation provides a plurality of determined provisioning times. The method also determines an order for the provisioning requests based on the plurality of determined provisioning times, such that the provisioning operations complete at substantially a same time.

Yet further, a computer system is provided that includes a memory and a processor in communications with the memory, wherein the computer system is configured to perform a method. The method receives a set of provisioning requests in a computer data structure of a networked computing environment, wherein the provisioning requests relate to a workload request. The method further identifies a set of provisioning operations for computing resources in the networked computing environment to perform the provisioning requests. The method determines, for each provisioning operation of the provisioning operations, a respective provisioning time, the respective provisioning time being an amount of time for a particular computing resource to become prepared and equipped to perform a job. The determining the respective provisioning time for each provisioning operation provides a plurality of determined provisioning times. The method also determines an order for the provisioning requests based on the plurality of determined provisioning times, such that the provisioning operations complete at substantially a same time.

BRIEF DESCRIPTION OF THE DRAWINGS

Aspects described herein are particularly pointed out and distinctly claimed as examples in the claims at the conclusion of the specification. The foregoing and other objects, features, and advantages of the invention are apparent from the following detailed description taken in conjunction with the accompanying drawings in which:

DETAILED DESCRIPTION

Described herein are aspects for provisioning computing resources for a workload including one of more jobs that themselves use, request, and/or require a plurality of computing resources. The computing resources may be provided in a networked computing environment, such as a cloud environment. The set of jobs may use, request and/or require multiple computing resources to be provisioned before they can begin.

A workload may be defined as the overall work to accomplish or complete, for instance that the user wishes to accomplish or complete, and may use, request, or require a plurality of provisioned resources to begin. The workload can include of one or more jobs. For example, a workload may require four provisioned resources and have one. Its job may be run on one of those four resources but the execution of that job might utilize all four resources. A workload may contain multiple jobs that use the same provisioned resources.

For example, a piece of software may be deployed in a clustered environment, running on multiple hosts that are in communication with each other. To test the software using cloud resources, the workload can include one job (to run the test) but require three resources, e.g.: two virtual machines (onto which the software under test is deployed) as a two-node cluster, and one virtual machine that runs the test framework and executes the job on the software cluster.

A workload request may be a request describing a workload, detailing the job(s) that the workload includes and the provisioning requirements used, requested and/or required to execute the job(s).

A job may be defined to be defined as a unit of execution performed as part of a workload, the execution being performed on one or more of the provisioned resources.

A provisioning operation may be defined as an operation executed by the networked computing environment, for example, a cloud environment, to provision and configure resources.

A provisioning request may be defined as a request describing an environment for provisioning and configuration.

Aspects presented herein include analyzing a workload request to determine computing resources that need provisioning. For each computing resource required for each job in the workload request, the method may calculate the estimated provisioning time. It may be determined whether the difference between the slowest and fastest provisioning time for the set of required resources is greater than a given threshold. If so, the starting times of the individual provisioning operations may be staggered such that all of at least a desired amount of the provisioning completes at substantially the same time.

Optimizing the provisioning of computing resources may be provided by reducing the amount of idle time of provisioned resources for workloads that require a plurality of infrastructure resources to be provisioned.

Provisioning a computing resource may be defined as carrying out required activities or prerequisites of the computing resource in order to be ready to carry out a job. The provisioning time may be the time it takes to complete each required activity or for a prerequisite to be available following a request for it.

Aspects described herein manage a set of provisioning requests, which individually may be potentially very different in their requirements, as a group such that the overall impact to resources may be minimized. This may include scheduling collections of potentially different workloads.

One implementation may abstract the concept of a workload away from a networked computing environment. A software solution may maintain a queue of workload requests and from it translate them into provisioning requests in a networked computing environment. The software controlling the workload queue may query the networked computing environment to be informed how long provisioning operations may take and use that to inform its translation.

Another implementation may be that the workload request may be defined within provisioning requests. Each provisioning request may include metadata describing which workload it belongs to and the total number of provisioning requests in that workload. From this, the networked computing environment may determine when all desired and/or necessary provisioning requests have been submitted for a given workload and then apply the optimization described.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numbers may be repeated among the figures to indicate corresponding or analogous features.

Figure 1:
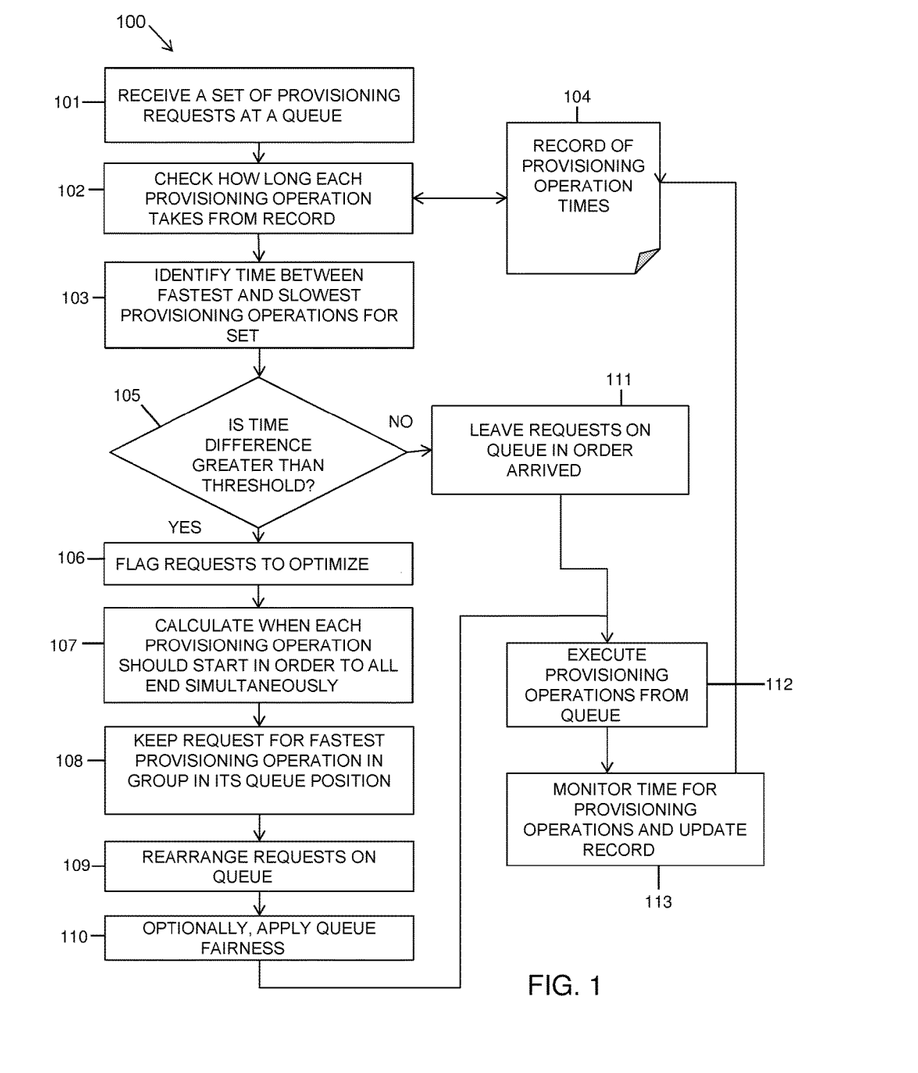
FIG. 1 is a flow diagram of an example embodiment of a method in accordance with aspects described herein.

Referring to FIG. 1, a flow diagram 100 shows an example embodiment of a method in accordance with aspects described herein. The method may be carried out at/by a provisioning system, which may monitor a queue of provisioning requests and provision the infrastructure they request.

The method receives a set of provisioning requests for a workload at a queue (101), which workload may require resources to be are available simultaneously. The resources that are desired for the workload may require provisioning operations in order to process the jobs of the workload.

When the provisioning system receives a new group of provisioning requests, it checks how long each provisioning operation will take to perform (102). A provisioning operation is an in-flight process that is provisioning some infrastructure. The method checks how long each provisioning operation takes (102), which may be checked from a record (104) of previous provisioning operation times.

A provisioning request may describe the resources to provision and the necessary configuration. When the system performs a provisioning operation, it can note what was requested and store how long the process took. Then, when a similar or identical provisioning request is encountered, this can be used to look up the previous provisioning operation duration.

In a test environment, there will often be many provisioning requests for the same specification of resource, as there are a limited number of platforms on which to test. Therefore, receiving similar or identical provisioning requests is commonplace.

For the provisioning operations required for a set of jobs of a workload, the method identifies the time between the fastest and slowest provisioning operation (103). The method then determines whether the time difference is greater than or equal to a configured threshold (105).

If the difference in provisioning times is less than the configured threshold (#105, NO), then the method leaves the provisioning requests in the workload on the queue (111), for instance in the order they arrived. The threshold may be set to reflect that the work required for changing the starting times of the provisioning operations is not worthwhile or the timing advantage gained is negligible. The threshold may be either calculated by the system or set by a user, as examples.

If instead at 105 it is determined that the difference in provisioning times is greater than or equal to the configured threshold (#105, YES), then the method flags the set of provisioning requests to optimize (106). The method then analyzes the provisioning operations for the flagged provisioning requests to calculate, based on the expected duration of the provisioning operations, the relative start times of the provisioning operations (107) in order that the provisioning operations for the set of provisioning requests all (in this example) finish at substantially the same time (e.g. within a timeframe of completion, such as a pre-defined timeframe in seconds, milliseconds, or the like, or a timeframe defined as a percentage of the longest provisioning operations or as percentage of total provisioning time for all provisioning operations, as examples). The method keeps the provisioning request for the fastest provisioning operation in the group in its queue position (108). The rearrangement of provisioning operations would generally not change the position in the queue of the fastest provision operation for a group so that the provisioning operations for groups remained for the most part in a first in, first out (FIFO) order to maintain fairness of access to provisioning.

The method rearranges provisioning requests on the queue (109), for instance to accommodate their calculated relative start times. Optionally, the rearrangement may be refined to improve queue fairness (110). Queue fairness refers to the balance of provisioning requests taking into account data including, but not limited to, how long a provisioning request has been waiting, its relative importance as set by the user, and its resource requirements.

After optionally applying queue fairness (110) or leaving the provisioning requests in the workload on the queue (111), the method executes provisioning requests/operations from the queue (112). The method monitors the time for the provisioning operations to complete and updates the record (104) of the provisioning operation times (113).

By monitoring the queue, the provisioning system identifies provisioning requests for which the provisioning operations are likely to complete at widely varying times. When such a workload is identified, the provisioning system begins the slower provisioning operations earlier, effectively allowing them to jump the queue, and when that workload has reached the front of the queue and the faster provision operations begin, the outcome will be the provisioning operations completing at substantially the same times.

The queue may contain provisioning requests relating to multiple different workloads that are interleaved and the provisioning requests may be rearranged (109) on the queue to accommodate their calculated relative start times in an interleaved manner.

Figure 2:
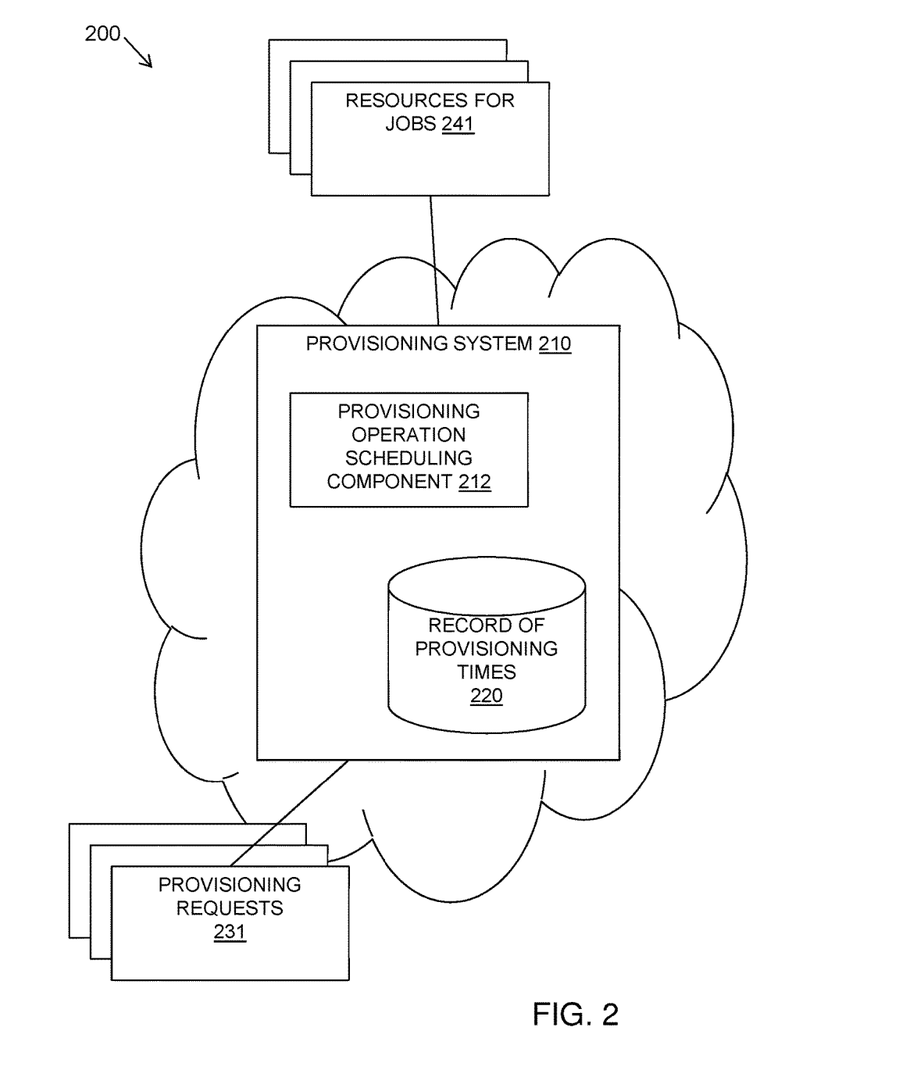
FIG. 2 is a schematic diagram of an environment in which a system in accordance with aspects described herein may be implemented.

FIG. 2 is a schematic diagram of an environment in which a system in accordance with aspects described herein may be implemented. Referring to FIG. 2, a block diagram shows a cloud architecture 200 in which the described provisioning system 210 may operate.

The provisioning system 210 may be an addition to an existing regular cloud provisioning architecture. It can extend the provisioning architecture by maintaining a record 220 of how long the different provisioning operations take if this is not provided by an existing provisioning architecture.

Provisioning requests 231 that relate to a single workload may be made to a provisioning system 210 of a cloud architecture. The provisioning requests 231 may require provisioning operations to provision resources 241 for the provisioning requests 231. The provisioning system 210 may allow provisioning requests to be grouped, which may allow an outside system to submit all provisioning requests 231 for a workload as a discrete unit.

The functionality of allowing groups of provisioning requests to be made could be provided as an application programming interface (API), for example. Therefore, an external system could request a plurality of provisioning requests needed for a workload and the provisioning system would understand that these provisioning requests were required for a single workload.

In order for the provisioning operations to all be ready at approximately the same time for provisioning requests 231 for a workload, the provisioning system 210 may include a provisioning operation scheduling component 212.

Figure 3:
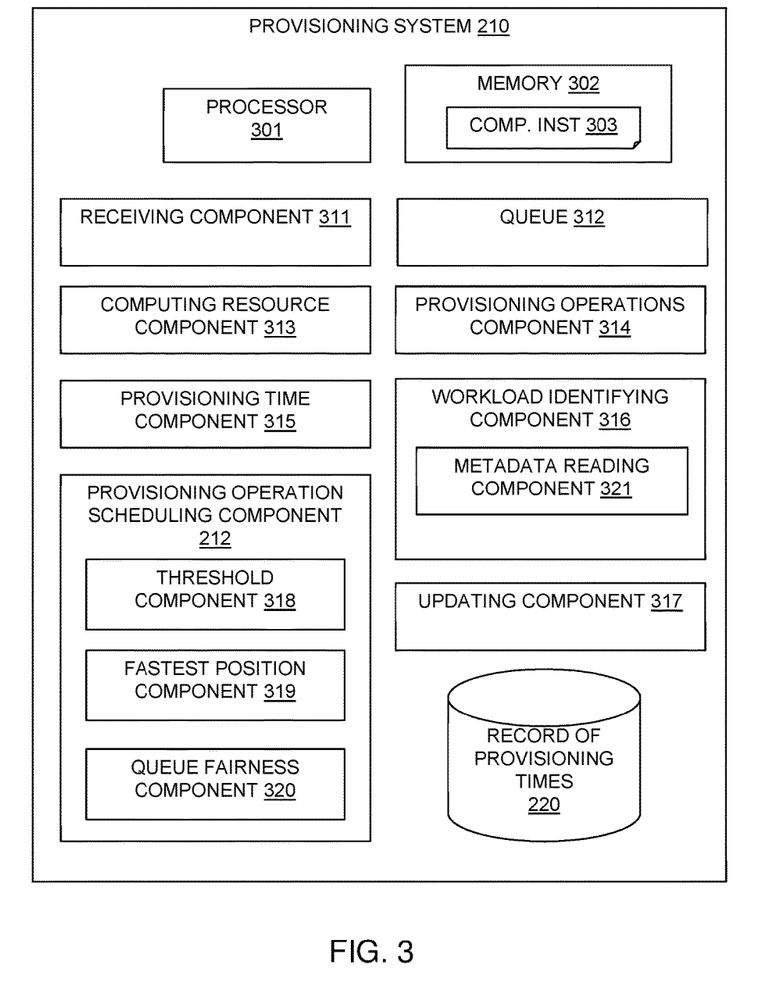
FIG. 3 is block diagram of an example embodiment of a system in accordance with aspects described herein.

Referring to FIG. 3, a block diagram shows an example embodiment of a provisioning system 210 in accordance with aspects described herein.

The provisioning system 210 may include at least one processor 301, a hardware module, or a circuit for executing the functions of the described components which may be software units executing on the at least one processor. Multiple processors running parallel processing threads may be provided enabling parallel processing of some or all of the functions of the components. Memory 302 may be configured to provide computer instructions 303 to the at least one processor 301 to carry out the functionality of the components.

The provisioning system 210 may include a receiving component 311 for receiving a set of provisioning requests in a computer data structure, such as a queue 312. A set of the provisioning requests may all relate to a discrete workload request. The provisioning system 210 may also include a workload identifying component 316 for identifying a set of provisioning requests for a workload request. The workload identifying component 316 may include a metadata reading component 321 for reading metadata included in a provisioning request identifying the workload to which it relates and the number of provisioning requests in the workload. The provisioning request may also contain the information regarding the job within the workload. Effectively after the configuration of the resource, post-provisioning may initiate the job it was provisioned to perform.

The provisioning system 210 may additionally include a computing resource component 313 for identifying a set of computing resources in the networked computing environment to perform the workload, as well as a provisioning operations component 314 for identifying a set of provisioning for each of the set of computing resources, and a provisioning time component 315 for determining the provisioning time for each of the provisioning operations, the provisioning time being an amount of time that a particular computing resource requires to become prepared and equipped to perform a job. The provisioning time component 315 may look up a record in the record of provisioning times 220 for computing resources. An updating component 317 may be included for updating the record 220 after provisioning operations of a computing resource are carried out.

The provisioning system 210 may further include a provisioning operation scheduling component 212 for determining an order for the provisioning operations based on the provisioning times needed such that the provisioning of the set of components finishes at substantially the same time. The provisioning operation scheduling component 212 may include a threshold component 318 for determining if the difference between the slowest and fastest determined provisioning times for the set of computing resources is greater than a given threshold.

The provisioning operation scheduling component 210 may include a fastest position component 319 for maintaining the fastest provisioning operation for the workload in place in the queue 312, as well as a queue fairness component 320 for applying queue fairness to the job requests.

In one example embodiment, a method and system may be applied for software testing in a cloud environment, specifically where a complex topology or other plurality of virtual machines (VMs) is required for testing. There may be tests that require a topology of VMs to run and these tests cannot begin to execute until all of the VMs in the topology are provisioned.

In the testing environments, provisioning of VMs from a cloud infrastructure is used to run testing. A number of these tests exercise the clustering functionality of the product or otherwise require a plurality of VMs. These tests may require all VMs to have been fully provisioned and configured as the test may require that the VMs are able to communicate with each other. Hence, execution of these tests may not begin until all provisioning operations are complete.

The VMs in the topology may have different configurations or software stacks, meaning that they may take differing amounts of time to provision. VMs with simple configurations or software stacks may provision quickly while VMs with complex configurations or software stacks may provision slowly. The time it takes for the cloud to perform the operation of provisioning a VM may also differ based on a number of factors such as the specification of the VM, how much additional configuration must be performed once the VM is "live" to make it ready for testing, etc.

This can lead to situations in which some VMs are provisioned quickly and then sit idle while VMs that are slower to provision spin-up. While these VMs are sitting idle they are wasting cloud resources such as RAM and, in a customer situation, that customer could be paying for the VMs sitting idle, rather than performing the workload for which they were provisioned.

Figure 4A:
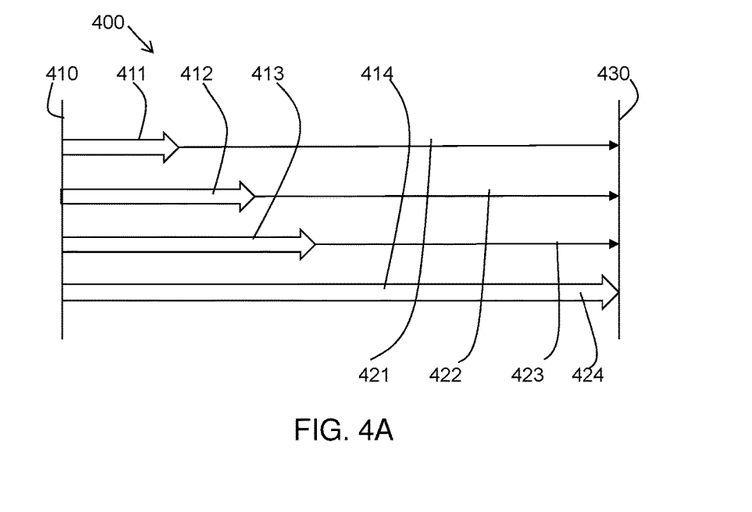
FIGS. 4A and 4B are schematic diagrams of provisioning times in accordance with aspects described herein.
Figure 4B:
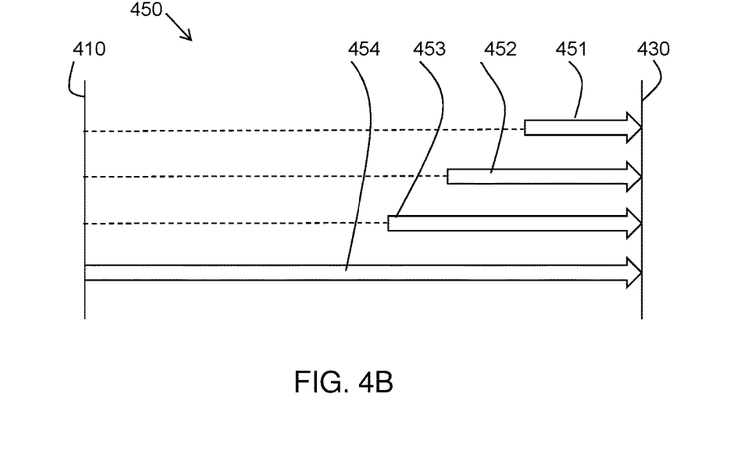

Referring to FIGS. 4A and 4B, schematic diagrams 400 (4A), 450 (4B) are schematic diagrams of provisioning times in accordance with aspects described herein, and illustrate the difference in VM provisioning times. A time of provisioning request 410 is shown with four timelines 421-424, one for each VM leading to a job start time 430.

FIG. 4A shows the VM idle time and thus resource wastage for a four VM topology when provisioning the VMs concurrent in a first in first out (FIFO). FIG. 4B shows the VMs when provisioned in accordance with aspects described here.

Referring to FIG. 4A, the four provisioning operations 411-414 are started concurrently (e.g. at the same time or substantially the same time, e.g. within some timeframe or percentage of total time taken to provision all VMs). It can be seen that when concurrently provisioning the four VMs, three operations (411, 412, 413) finish provisioning and sit idle for respective periods of time (421, 422, 423, respectively), which consumes resources, until the fourth operation 414 finishes provisioning and thus the test can start.

Referring to FIG. 4B, the provisioning operations 451-454 start intelligently and they finish at roughly the same time (e.g. within some timeframe or percentage of total time taken to provision all VMs), which eliminates/reduces resource wastage as none of them sit idle.

The cloud may be able to provision other VMs for running other jobs using the resources saved when intelligent provisioning is used. This allows for greater job-throughput for the cloud and for more efficient use to be made of the limiting physical resources.

Methods and systems described herein address a problem of multiple jobs for a discrete workload that require multiple resources, such as VMs, which may be of different configuration or specification, to be provisioned before the jobs can proceed.

Described aspects address unnecessary over committing of cloud resources caused by some resources being provisioned for a job and sitting idle while other outstanding provision jobs (which take longer to complete) are in progress.

While cloud infrastructure is marketed as being a pool of unlimited virtual resource, in fact this virtual resource is backed by a finite pool of physical resource. While this physical resource can be used more efficiently by sharing it between virtual infrastructure, it still is a hard cap on what virtual resource is available.

Some physical resources are easier to share among virtual resources, for example CPU may be easily shared between VMs as idle cycles in one VM can be used by another VM. RAM, on the other hand, is generally dedicated to a VM and not shared; an idle VM with 8 GB of RAM will usually not page it out to disk to free up the physical RAM backing it (which would allow it to be shared with other VMs) because of the poor performance when reading it back from disk later.

An optimization that reduces the number of idle VMs would make more resources available to the rest of the cloud. This in turn means that customers being charged based on the resources they are using (e.g. GB/hour) pay less, and more VMs can be provisioned without the need for additional physical resource.

Accordingly, aspects described herein provide a computer-implemented method for provisioning of computing resources for a workload in a networked computing environment. The method can include receiving a set of provisioning requests in a computer data structure of the networked computing environment, wherein the provisioning requests all relate to a workload request; identifying a set of provisioning operations for computing resources in the networked computing environment needed to perform the provisioning requests; determining the provisioning time for each of the provisioning operations, the provisioning time being an amount of time that a particular computing resource requires to become prepared and equipped to perform a job; and determining an order for the provisioning requests based on the provisioning times needed such that the provisioning of the set of components finishes at substantially the same time.

The method can include identifying a set of provisioning requests for a workload request which require multiple computing resources to be provisioned before the workload can begin.

Determining the provisioning time for each of the provisioning operations can include looking up a record of provisioning times for computing resources; and updating the record after provisioning operations of a computing resource are carried out. Looking up a record of provisioning times for computing resources can look up a similar or identical provisioning operation.

Determining an order for the provisioning requests can include, for a workload request, if the difference between the slowest and fastest determined provisioning times for the set of computing resources is greater than a given threshold, vary the start of the provisioning requests such that all the provisioning operations complete at substantially the same time.

The provisioning requests can include metadata indicating a workload request they belong to and the number of provisioning requests in the workload.

Receiving a set of provisioning requests in a computer data structure can receive the provisioning requests in a queue at a provisioning service. Determining an order for the provisioning requests can maintain the fastest provisioning request for the workload in place in the queue. Determining an order for the provisioning requests can apply queue fairness to the provisioning requests.

The networked computing environment can be a cloud environment and the method can be provided as a service in the cloud environment.

In accordance with additional aspects, a system is provided for provisioning of computing resources for a workload in a networked computing environment. The system can include a processor and a memory configured to provide computer program instructions to the processor to execute the function of components; a receiving component for receiving a set of provisioning requests in a computer data structure of the networked computing environment, wherein the provisioning requests all relate to a discrete workload request; a provisioning operations component for identifying a set of provisioning operations for computing resources in the networked computing environment needed to perform the provisioning requests; a provisioning time component for determining the provisioning time for each of the provisioning operations, the provisioning time being an amount of time that a particular computing resource requires to become prepared and equipped to perform a job; and a provisioning operation scheduling component for determining an order for the provisioning requests based on the provisioning times needed such that the provisioning of the set of components finishes at substantially the same time.

The system can include a workload identifying component for identifying a set of provisioning requests for a workload request which require multiple computing resources to be provisioned before the workload can begin. The provisioning requests can include metadata indicating a workload request they belong to and the number of provisioning requests in the workload, and wherein the workload identifying component can include a metadata reading component.

The provisioning time component can look up a record of provisioning times for computing resources; and the system can include an updating component for updating the record after provisioning operations of a computing resource are carried out.

The provisioning operation scheduling component for determining an order for the provisioning requests can include a threshold component for determining if the difference between the slowest and fastest determined provisioning times for the set of computing resources is greater than a given threshold.

The receiving component for receiving a set of provisioning requests in a computer data structure can receive the provisioning requests in a queue at a provisioning service. The provisioning operation scheduling component can maintain the fastest provisioning request for the workload in place in the queue. The provisioning operation scheduling component can apply queue fairness to the provisioning requests.

The networked computing environment may be a cloud environment and the provisioning operation scheduling component can be provided as a service in the cloud environment.

In accordance with further aspects described herein, a computer program product is provided for optimizing provisioning of computing resources in a networked computing environment, the computer program product including a computer readable storage medium having program instructions embodied therewith, the program instructions executable by a processor to cause the processor to: receive a set of provisioning requests in a computer data structure of the networked computing environment, wherein the provisioning requests all relate to a workload request; identify a set of provisioning operations for computing resources in the networked computing environment needed to perform the provisioning requests; determine the provisioning time for each of the provisioning operations, the provisioning time being an amount of time that a particular computing resource requires to become prepared and equipped to perform a job; and determine an order for the provisioning requests based on the provisioning times needed such that the provisioning of the set of components finishes at substantially the same time.

Figure 5:
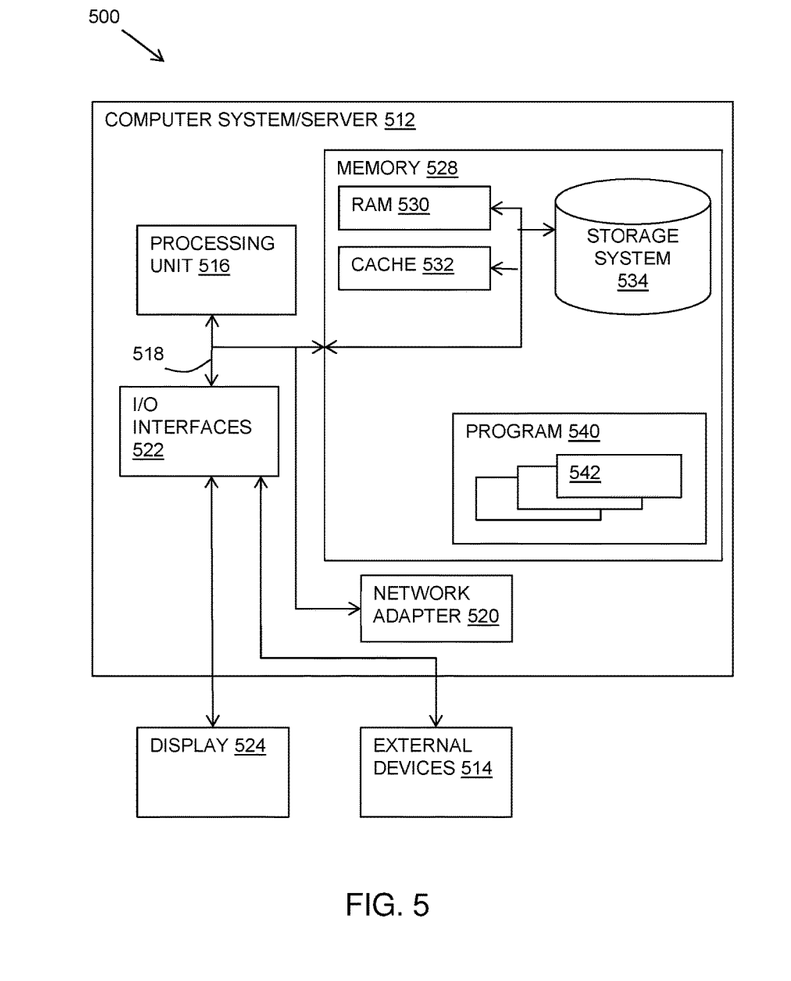
FIG. 5 is a block diagram of an embodiment of a computer system or cloud server in which aspects described herein may be implemented.

Referring now to FIG. 5, a schematic diagram of an example of a system 500 in the form of a computer system or server is shown, in which aspects described herein may be implemented.

A computer system or server 512 may be operational with numerous other general purpose or special purpose computing system environments or configurations. Examples of well-known computing systems, environments, and/or configurations that may be suitable for use with computer system/server 512 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 512 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 512 may be practiced in distributed cloud computing environments where tasks are performed by remote processing devices that are linked through one or more communications networks. In a distributed cloud computing environment, program modules may be located in either or both of local and remote computer system storage media including memory storage devices.

In FIG. 5, a computer system/server 512 is shown in the form of a general-purpose computing device. The components of the computer system/server 512 may include, but are not limited to, one or more processors or processing units 516, a system memory 528, and a bus 518 that couples various system components including system memory 528 to processor 516.

Bus 518 represents one or more of any of several types of bus structures, including a memory bus or memory controller, a peripheral bus, an accelerated graphics port, and a processor or local bus using any of a variety of bus architectures. By way of example and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 512 typically includes a variety of computer system readable media. Such media may be any available media that is accessible by computer system/server 512, and it includes both volatile and non-volatile media, removable and non-removable media.

System memory 528 can include computer system readable media in the form of volatile memory, such as random access memory (RAM) 530 and/or cache memory 532. Computer system/server 512 may further include other removable/non-removable, volatile/non-volatile computer system storage media. By way of example only, storage system 534 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided.

In such instances, each can be connected to bus 518 by one or more data media interfaces. As will be further depicted and described below, memory 528 may include at least one program product having a set (e.g., at least one) of program modules that are configured to carry out the functions of embodiments of the invention.

Program/utility 540, having a set (at least one) of program modules 542, may be stored in memory 528 by way of example, and not limitation, as well as an operating system, one or more application programs, other program modules, and program data. Each of the operating system, one or more application programs, other program modules, and program data or some combination thereof, may include an implementation of a networking environment. Program modules 542 generally carry out the functions and/or methodologies of embodiments of the invention as described herein.

Computer system/server 512 may also communicate with one or more external devices 514 such as a keyboard, a pointing device, a display 524, etc.; one or more devices that enable a user to interact with computer system/server 512; and/or any devices (e.g., network card, modem, etc.) that enable computer system/server 512 to communicate with one or more other computing devices. Such communication can occur via Input/Output (I/O) interfaces 522. Still yet, computer system/server 512 can communicate with one or more networks such as a local area network (LAN), a general wide area network (WAN), and/or a public network (e.g., the Internet) via network adapter 520. As depicted, network adapter 520 communicates with the other components of computer system/server 512 via bus 518. It should be understood that although not shown, other hardware and/or software components could be used in conjunction with computer system/server 512. Examples, include, but are not limited to: microcode, device drivers, redundant processing units, external disk drive arrays, RAID systems, tape drives, and data archival storage systems, etc.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics may be as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models may be as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models may be as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 6:
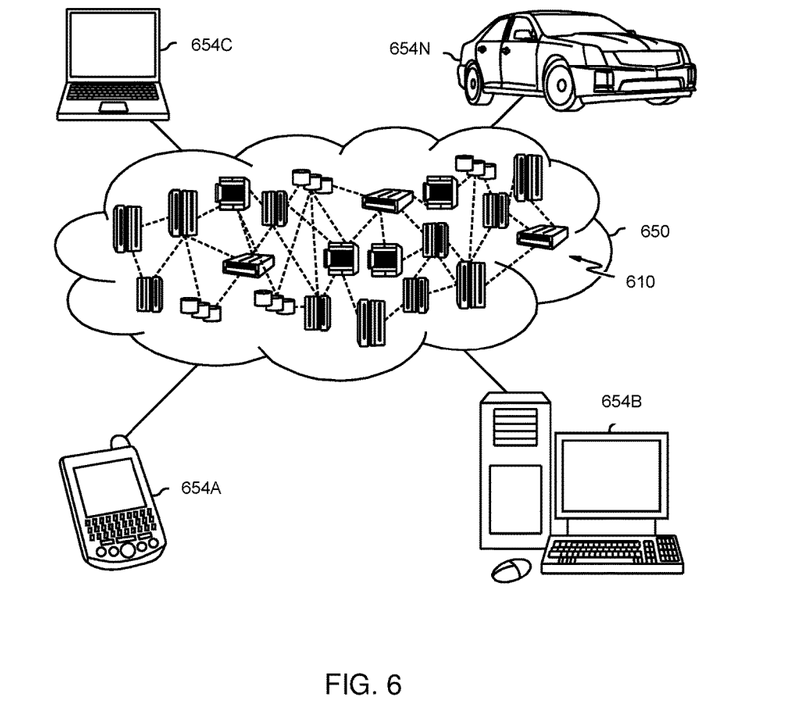
FIG. 6 is a schematic diagram of a cloud computing environment in which aspects described herein may be implemented.

Referring now to FIG. 6, illustrative cloud computing environment 650 is depicted, in which aspects described herein may be implemented. As shown, cloud computing environment 650 includes one or more cloud computing nodes 610 with which local computing devices used by cloud consumers, such as, for example, personal digital assistant (PDA) or cellular telephone 654A, desktop computer 654B, laptop computer 654C, and/or automobile computer system 654N may communicate. Nodes 610 may communicate with one another. They may be grouped (not shown) physically or virtually, in one or more networks, such as Private, Community, Public, or Hybrid clouds as described hereinabove, or a combination thereof. This allows cloud computing environment 650 to offer infrastructure, platforms and/or software as services for which a cloud consumer does not need to maintain resources on a local computing device. It is understood that the types of computing devices 654A-N shown in FIG. 6 are intended to be illustrative only and that computing nodes 610 and cloud computing environment 650 can communicate with any type of computerized device over any type of network and/or network addressable connection (e.g., using a web browser).

Figure 7:
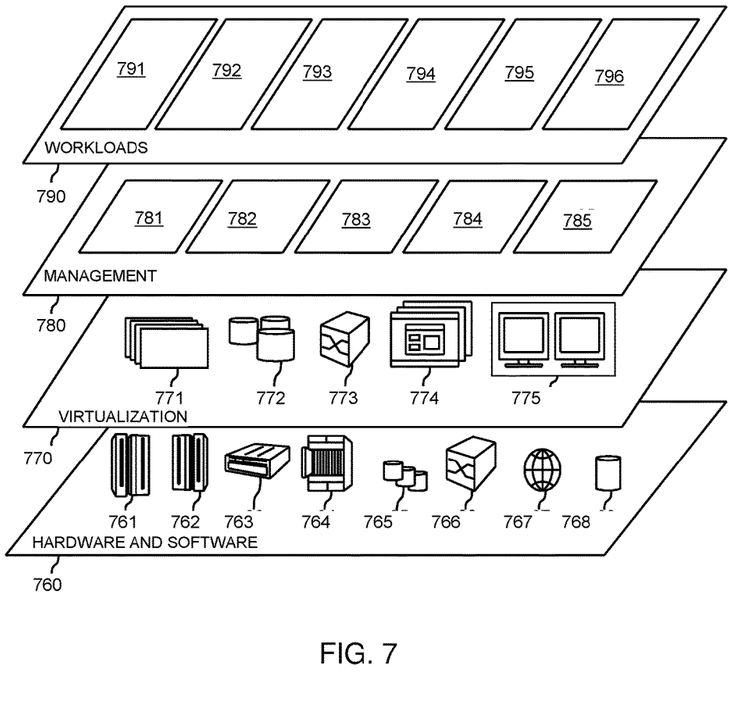
FIG. 7 is a diagram of abstraction model layers of a cloud computing environment in which aspects described herein may be implemented.

Referring now to FIG. 7, a set of functional abstraction layers is shown provided by cloud computing environment 650 (FIG. 6) in which aspects described herein may be implemented. It should be understood in advance that the components, layers, and functions shown in FIG. 7 are intended to be illustrative only and embodiments of the invention are not limited thereto. As depicted, the following layers and corresponding functions are provided:

Hardware and software layer 760 includes hardware and software components. Examples of hardware components include: mainframes 761; RISC (Reduced Instruction Set Computer) architecture based servers 762; servers 763; blade servers 764; storage devices 765; and networks and networking components 766. In some embodiments, software components include network application server software 767 and database software 768.

Virtualization layer 770 provides an abstraction layer from which the following examples of virtual entities may be provided: virtual servers 771; virtual storage 772; virtual networks 773, including virtual private networks; virtual applications and operating systems 774; and virtual clients 775.

In one example, management layer 780 may provide the functions described below. Resource provisioning 781 provides dynamic procurement of computing resources and other resources that are utilized to perform tasks within the cloud computing environment. Metering and Pricing 782 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 783 provides access to the cloud computing environment for consumers and system administrators. Service level management 784 provides cloud computing resource allocation and management such that required service levels are met. Service Level Agreement (SLA) planning and fulfillment 785 provide pre-arrangement for, and procurement of, cloud computing resources for which a future requirement is anticipated in accordance with an SLA.

Workloads layer 790 provides examples of functionality for which the cloud computing environment may be utilized. Examples of workloads and functions which may be provided from this layer include: mapping and navigation 791; software development and lifecycle management 792; virtual classroom education delivery 793; data analytics processing 794; transaction processing 795; and resource provisioning 796 as described herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description, but is not intended to be exhaustive or limited to in the form disclosed. Many modifications and variations will be apparent to those of ordinary skill in the art. The embodiments were chosen and described in order to best explain various aspects and the practical application, and to enable others of ordinary skill in the art to understand various embodiments with various modifications as are suited to the particular use contemplated.

What is claimed is:

1. A computer-implemented method comprising:
  receiving a set of provisioning requests in a computer data structure of a networked computing environment, wherein the provisioning requests relate to a workload request;
  identifying a set of provisioning operations for computing resources in the networked computing environment to perform the provisioning requests;
  determining, for each provisioning operation of the provisioning operations, a respective provisioning time, the respective provisioning time being an amount of time to provision a particular computing resource by completing one or more activities in order for the computing resource to be ready for job performance, wherein the determining the respective provisioning time for each provisioning operation provides a plurality of determined provisioning times;
  selecting between: (i) determining an order for the provisioning requests based on the plurality of determined provisioning times, such that the provisioning operations of the set of provisioning operations complete at substantially a same time by rearranging the provisioning operations from an initial order on a request queue to the determined order, moving completion times of at least some of the provisioning operations to substantially the same time, the same time being a completion time of a fastest completing provisioning operation of the provisioning operations and (ii) leaving the provisioning requests in an order in which they are received, the selecting comprising:
    comparing a difference between a slowest determined provisioning time, of the plurality of determined provisioning times, and a fastest determined provisioning time, of the plurality of determined provisioning times to a given threshold amount of time; and based on the difference between the slowest determined provisioning time and the fastest determined provisioning time exceeding the threshold selecting to perform the determining of the order for the provisioning requests based on the plurality of determined provisioning times; and initiating execution of the provisioning requests based on the selecting.

2. The method of claim 1, further comprising identifying the set of provisioning requests based on the workload request for which multiple computing resources are to be provisioned before the workload can begin.

3. The method of claim 1, wherein determining the respective provisioning time for each provisioning operation of the provisioning operations comprises accessing a record of provisioning times for computing resources, and updating the record based on provisioning operations of a computing resource being carried out.

4. The method of claim 3, wherein the accessing the record of provisioning times for computing resources accesses a record for a provisioning operation similar or identical to a provisioning operation, of the provisioning operations, for which the respective provisioning time is being determined.

5. The method of claim 1, wherein the provisioning requests of the set of provisioning requests include metadata indicating the workload request to which the provisioning requests belong and a number of provisioning requests in the workload.

6. The method of claim 1, wherein the receiving the set of provisioning requests comprises receiving the provisioning requests of the set of provisioning requests in a queue at a provisioning service.

7. The method of claim 6, wherein determining an order for the provisioning requests maintains the fastest provisioning request for the workload in place in the queue.

8. The method of claim 6, wherein the determining the order for the provisioning requests applies queue fairness to the provisioning requests of the set of provisioning requests.

9. The method of claim 1, wherein the computing resources are for a workload in the networked computing environment, the networked computing environment comprising a cloud environment, wherein the receiving the set of provisioning requests, the identifying the set of provisioning operations, the determining the respective provisioning times, and the determining the order for the provisioning requests are provided as a service in the cloud environment.

10. A computer system comprising:
a memory; and
a processor in communication with the memory, wherein the computer system is configured to perform a method, the method comprising:
receiving a set of provisioning requests in a computer data structure of a networked computing environment, wherein the provisioning requests relate to a workload request;
identifying a set of provisioning operations for computing resources in the networked computing environment to perform the provisioning requests;
determining, for each provisioning operation of the provisioning operations, a respective provisioning time, the respective provisioning time being an amount of time to provision a particular computing resource by completing one or more activities in order for the computing resource to be ready for job performance, wherein the determining the respective provisioning time for each provisioning operation provides a plurality of determined provisioning times selecting between: (i) determining an order for the provisioning requests based on the plurality of determined provisioning times, such that the provisioning operations of the set of provisioning operations complete at substantially a same time by rearranging the provisioning operations from an initial order on a request queue to the determined order, moving completion times of at least some of the provisioning operations to substantially the same time, the same time being a completion time of a fastest completing provisioning operation of the provisioning operations and (ii) leaving the provisioning requests in an order in which they are received, the selecting comprising:

comparing a difference between a slowest determined provisioning time, of the plurality of determined provisioning times, and a fastest determined provisioning time, of the plurality of determined provisioning times to a given threshold amount of time; and based on the difference between the slowest determined provisioning time and the fastest determined provisioning time exceeding the threshold selecting to perform the determining of the order for the provisioning requests based on the plurality of determined provisioning times; and initiating execution of the provisioning requests based on the selecting.

11. The computer system of claim 10, wherein the method further comprises identifying the set of provisioning requests based on the workload request for which multiple computing resources are to be provisioned before the workload can begin.

12. The computer system of claim 11, wherein the provisioning requests of the set of provisioning requests include metadata indicating the workload request to which the provisioning requests belong and a number of provisioning requests in the workload.

13. The computer system of claim 10, wherein determining the respective provisioning time for each provisioning operation of the provisioning operations comprises accessing a record of provisioning times for computing resources, and updating the record based on provisioning operations of a computing resource being carried out.

14. The computer system of claim 10, wherein the receiving the set of provisioning requests comprises receiving the provisioning requests of the set of provisioning requests in a queue at a provisioning service.

15. The system as claimed in claim 14, wherein determining an order for the provisioning requests maintains the fastest provisioning request for the workload in place in the queue.

16. The system as claimed in claim 14, wherein the determining the order for the provisioning requests applies queue fairness to the provisioning requests of the set of provisioning requests.

17. The system as claimed in claim 10, wherein the computing resources are for a workload in the networked computing environment, the networked computing environment comprising a cloud environment, wherein the receiving the set of provisioning requests, the identifying the set of provisioning operations, the determining the respective provisioning times, and the determining the order for the provisioning requests are provided as a service in the cloud environment.

18. A computer program product comprising:
   a computer readable storage medium readable by a processing circuit and storing instructions for execution by the processing circuit for performing a method comprising:
      receiving a set of provisioning requests in a computer data structure of a networked computing environment, wherein the provisioning requests relate to a workload request;
      identifying a set of provisioning operations for computing resources in the networked computing environment to perform the provisioning requests;
      determining, for each provisioning operation of the provisioning operations, a respective provisioning time, the respective provisioning time being an amount of time to provision a particular computing resource by completing one or more activities in order for the computing resource to be ready for job performance, wherein the determining the respective provisioning time for each provisioning operation provides a plurality of determined provisioning times;
      selecting between: (i) determining an order for the provisioning requests based on the plurality of determined provisioning times, such that the provisioning operations of the set of provisioning operations complete at substantially a same time by rearranging the provisioning operations from an initial order on a request queue to the determined order, moving completion times of at least some of the provisioning operations to substantially the same time, the same time being a completion time of a fastest completing provisioning operation of the provisioning operations and (ii) leaving the provisioning requests in an order in which they are received, the selecting comprising:
         comparing a difference between a slowest determined provisioning time, of the plurality of determined provisioning times, and a fastest determined provisioning time, of the plurality of determined provisioning times to a given threshold amount of time; and
         based on the difference between the slowest determined provisioning time and the fastest determined provisioning time exceeding the threshold selecting to perform the determining of the order for the provisioning requests based on the plurality of determined provisioning times; and
   initiating execution of the provisioning requests in the determined order based on the selecting.

* * * * *